(12) United States Patent
Mimura (10) Patent No.: US 6,458,054 B1
(45) Date of Patent: Oct. 1, 2002

(54) TRANSMISSION

(76) Inventor: Kenji Mimura, 29-1105, Wakabadai 4-chome, Asahi-ku, Yokohama-shi, Kanagawa 241-0801 (JP)

( * ) Notice: Subject to any disclaimer, the term of this patent is extended or adjusted under 35 U.S.C. 154(b) by 0 days.

(21) Appl. No.: 09/395,561

(22) Filed: Sep. 14, 1999

(30) Foreign Application Priority Data

Jul. 27, 1999 (JP) .......................................... 11-212024

(51) Int. Cl.$^7$ ................................................ F16H 7/18
(52) U.S. Cl. ........................ 474/100; 474/47; 474/49; 474/237
(58) Field of Search ............................... 474/47, 49, 53, 474/54, 56, 57, 64, 65, 66, 67, 68, 237, 100

(56) References Cited

U.S. PATENT DOCUMENTS

| | | | | |
|---|---|---|---|---|
| 672,962 A | * | 4/1901 | Seymour | 474/53 |
| 2,005,438 A | * | 6/1935 | Ohnesorge | 474/65 |
| 2,836,983 A | * | 6/1958 | Stewart | 474/65 |
| 4,815,271 A | * | 3/1989 | Lapeyre | 59/84 |
| 4,875,894 A | * | 10/1989 | Clark | 474/49 |
| 4,892,507 A | * | 1/1990 | Patin et al. | 474/50 |
| 5,049,113 A | * | 9/1991 | Graham | 474/49 |
| 5,688,199 A | * | 11/1997 | Spirig | 474/49 |
| 5,830,093 A | * | 11/1998 | Yanay | 474/49 |
| D430,825 S | * | 9/2000 | Nakamura | D12/124 |
| 6,152,844 A | * | 11/2000 | Daugherty | 474/49 |

FOREIGN PATENT DOCUMENTS

| | | |
|---|---|---|
| DE | 727593 | 11/1942 |
| JP | 62-75167 | 7/1987 |
| WO | WO 93/07045 | 9/1992 |

* cited by examiner

Primary Examiner—Thomas R. Hannon
Assistant Examiner—Vicky A. Johnson
(74) Attorney, Agent, or Firm—Lowe Hauptman Gilman & Berner, LLP

(57) ABSTRACT

The present invention provides a transmission capable of surely transmitting power even in a configuration in which the diameter of a rotating body is changed. When movable members of the rotating body are moved in the radial direction, the diameter of a winding member that is wound around the movable members increases or decreases, so that the speed reducing ratio with respect to the other rotating body changes. In this case, the circumferential length of the winding member that is wound around the movable members is changed by causing the other end side of the winding member to go in or out through between the movable members. At this time, since the circumferential length of the winding member changes stepwise by the predetermined number of the engagement portions of the winding member, the engagement portions of the transmitting member can always be engaged surely with the engagement portions of the winding member even if the speed is changed. Also, since bending points of the winding member and the transmitting member engaging with each other come to almost the same positions, the positions of bending points of the winding member and the transmitting member do not change relatively when the winding member and the transmitting member are bent.

20 Claims, 13 Drawing Sheets

TRANSMISSION

The present invention relates to a transmission used for various machines requiring the transmission of power, such as automobiles, bicycles, and other transportation machines.

DESCRIPTION OF THE RELATED ART

Conventionally, there has been known a transmission comprising an endless belt passing around a pulley, in which a belt winding portion of the pulley is formed by many movable members arranged at intervals in the circumferential direction, and the movable members are moved in the radial direction, by which the diameter of the belt winding portion of the pulley is changed, as disclosed in Japanese Patent Laid-Open No. 62-75167, for example.

However, like the above-described transmission, a construction which transmits power by means of belt-to-pulley contact has a problem in that the whole transmission is made large when great power is transmitted because the transmission efficiency of power is decreased by a slip of the belt, so that it is difficult to practically use such a construction.

To solve this problem, for example, International Publication No. WO93/07045, U.S. Pat. No. 5,049,113, and German Patent No. 727593 have disclosed a transmission comprising a winding member with ends which are wound around the movable members of the pulley from the outside, wherein one end of the winding member is fixed to a predetermined movable member, the other end of the winding member is inserted into the inside of the pulley in an unfixed state, and a transmitting member comprising a toothed belt or a chain is engaged with the winding member. This configuration has an advantage that a slip does not occur when power is transmitted because the transmitting member is engaged with the winding member. However, in such a configuration, because bending points of the winding member and bending points of the transmitting member (for example, turning support points connecting components of the chain) are away from each other in the radial or circumferential direction of the pulley, the winding member and the transmitting member are engaged with each other when the pulley has a predetermined diameter, but when the diameter of the pulley changes, the positions of the bending points of the winding member and the bending points of the transmitting member shift in the circumferential direction of the pulley, so that the winding member and the transmitting member cannot be engaged with each other. Therefore, it is impossible to practically use the conventional construction as a transmission.

SUMMARY OF THE INVENTION

The present invention has been made to solve the above problems, and accordingly an object thereof is to provide a transmission capable of surely transmitting power even in a configuration in which the diameter of a rotating body is changed.

To attain the above object, the present invention provides a transmission comprising an endless transmitting member having many engagement portions arranged at equal intervals in the peripheral direction on the inner peripheral surface thereof and a pair of rotating bodies around which the transmitting member passes, wherein the transmitting member winding portion of at least one rotating body is formed by many movable members which are arranged at intervals in the circumferential direction of the rotating body and capable of moving in the radial direction of the rotating body, and the diameter of the winding portion of the rotating body is increased or decreased by moving the movable members in the radial direction, characterized in that there is provided a winding member with ends which is wound around the winding portion of the rotating body from the outside, one end of which is fixed to a predetermined movable member, the other end side of which is inserted into the inside of the winding portion through between predetermined movable members, and which has many engagement portions engaging with engagement portions of the transmitting member on the outer peripheral surface; the movable members are provided so as to move stepwise in the radial direction of the rotating body so that the circumferential length of the winding member at the winding portion changes in increments of the predetermined number of the engagement portions; and when the winding member and the transmitting member are engaged with each other, bending points thereof come to almost the same positions. Thereby, a rotational force is transmitted by the engagement of the engagement portions of the transmitting member with the engagement portions of the winding member, so that power is transmitted without the occurrence of a slip between the transmitting member and the winding member. Therefore, the power transmitting efficiency can be enhanced, and the transmission body can be made small. Also, when the movable members are moved in the radial direction, the diameter of the winding member that is wound around the movable members increases or decreases, so that the speed reducing ratio with respect to the other rotating body changes. That is to say, the circumferential length of the winding member that is wound around the movable members is changed by causing the other end side of the winding member to go in or out through between the movable members. At this time, the circumferential length of the winding member changes stepwise by the predetermined number of the engagement portions of the winding member, so that the engagement portions of the transmitting member and the winding member are always engaged surely with each other at any speed change position. At this time, when the winding member and the transmitting member are engaged with each other, the bending points thereof come to almost the same position, so that the positions of the bending points of the winding member and the transmitting member do not change relatively even if the diameter of the winding portion of the rotating body is changed. Therefore, even if the diameter of the rotating body is changed, the engagement state of the winding member with the transmitting member can be kept surely.

Also, according to the present invention, in the above configuration the rotating body comprises a first side plate rotating integrally with the rotating shaft of the rotating body, and a second side plate capable of turning relative to the first side plate around the rotating shaft of the rotating body; the first side plate is formed with many elongated holes engaging movably with the movable member; and the second side plate is formed with many elongated holes engaging movably with the movable member and intersecting the elongated hole in the first side plate. Thereby, by relatively turning the first and second side plates, the diameter of the winding member that is wound around the movable members is changed. Therefore, a reliable speed change operation can be provided by a simple structure, which is very advantageous in practical use. In this case, the elongated holes of the first side plate are formed straight in the radial direction, and the elongated holes of the second side plate are formed slantwise with respect to the elongated hole in the first side plate. Thereby, when the movable members are moved in the radial direction, a relative rotational difference between the movable members and the rotating body does not occur. Therefore, the tension of the transmitting member does not change at the time of speed change, and a stable speed change operation can always be performed.

Also, according to the present invention, in the above configuration, a plurality of winding members are provided in the circumferential direction or the width direction of the rotating body, and the winding members are arranged so as to be symmetrical with each other with respect to the rotating shaft of the rotating body. Thereby, the center of gravity of the rotating body can always be maintained on the rotating shaft thereof, and vibrations caused by a positional shift between the center of rotation and the center of gravity of the rotating body can surely be prevented from occurring.

Also, according to the present invention, in the above configuration, on one end side in the axial direction of the rotating body, there is provided an auxiliary member with ends which has a mass and a length equivalent to those of the winding member and moves in the radial direction of the rotating body in synchronism with the winding member, and the auxiliary member is arranged so as to be symmetrical with the winding member with respect to the rotating shaft of the rotating body. Thereby, the center of gravity is displaced with respect to the rotating shaft of the rotating body by the other end side of the winding member in an unfixed state existing partially in the circumferential direction. However, the auxiliary member having a mass and a length equivalent to those of the winding member is arranged so as to be symmetrical with the winding member, and moves in the radial direction of the rotating body in synchronism with the winding member, so that the displacement of the center of gravity of the rotating body is corrected to the side of the rotating shaft thereof, and vibrations caused by a positional shift between the center of rotation and the center of gravity of the rotating body can surely be prevented from occurring even when one winding member is used.

Also, according to the present invention, in the above configuration, the transmitting member is formed by many link members both ends of which are connected to each other rotatably, the engagement portions are formed with the turning support point of the link member being the center, and a concave portion for accommodating a portion between the engagement portions in the winding member is provided between the turning support points of the link member. In this case, the link member is formed so that a part of the concave portion extends to a portion beyond a straight line connecting the turning support points of the link member. Thereby, when a tensile force is applied to the transmitting member, the link member is subjected to elastic bending deformation. Therefore, if a sudden driving force is applied to the transmitting member, the shock can be absorbed, and the reduction in noise and the improvement in durability can be achieved.

DESCRIPTION OF THE PREFERRED EMBODIMENTS

FIGS. 1 to 10 show a first embodiment of the present invention. A transmission shown in these figures comprises a pulley 10 comprising a rotating body, a winding member 20 attached to the pulley 10, an endless belt 30 serving as a transmitting member passing around the pulley 10, and a variable mechanism 40 for changing the diameter of the pulley 10. The pulley 10 is installed to a pulley shaft 50.

Figure 4A:
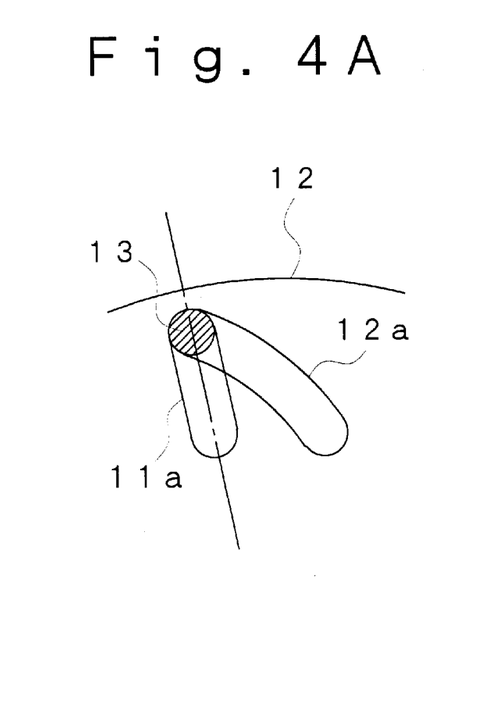
FIGS. 4A and 4B are explanatory views for illustrating the operation of a movable member and each of elongated holes.
Figure 4B:
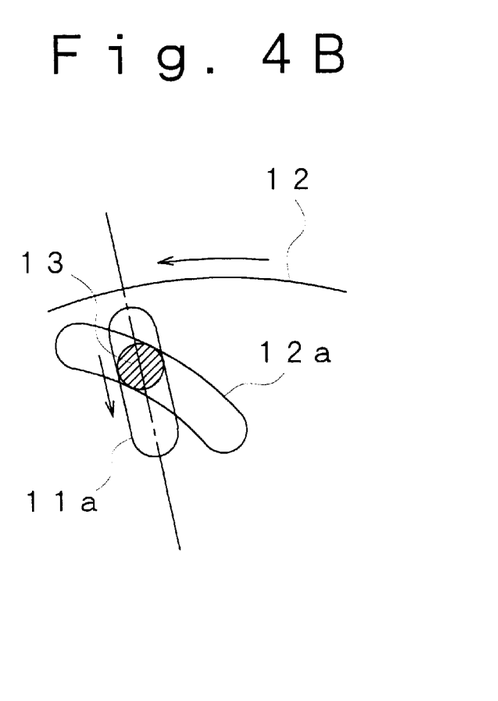
Figure 5:
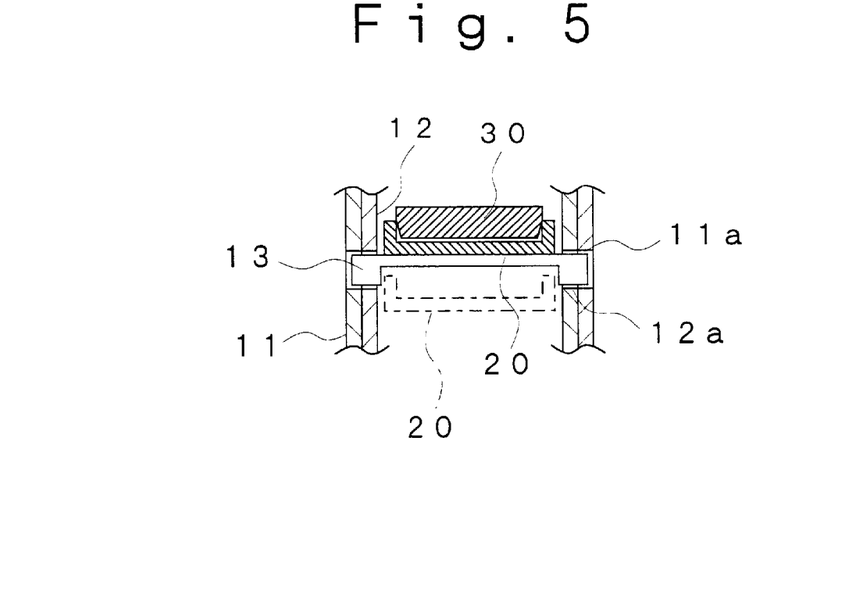
FIG. 5 is a front view of a movable member for fixing a belt.
Figure 6:
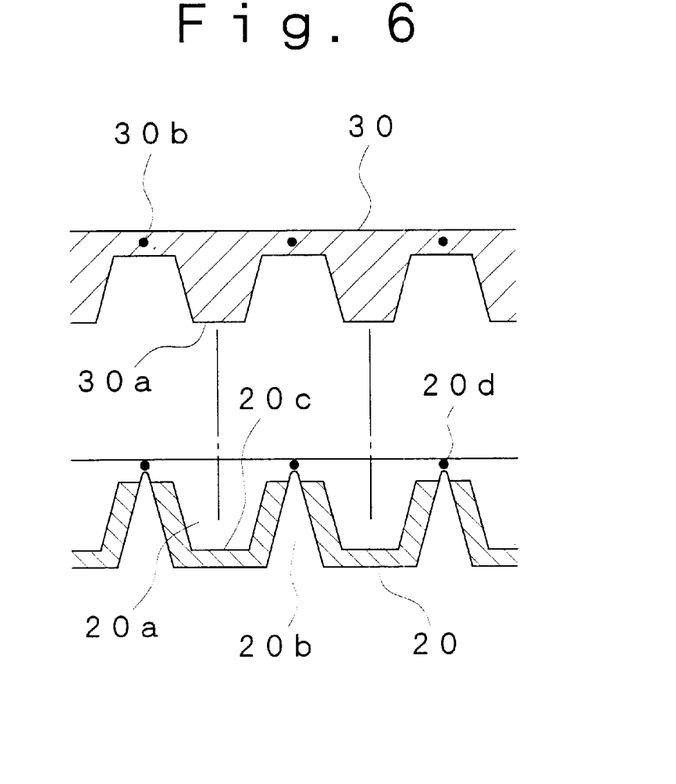
FIG. 6 is a partially sectional view of a winding member and the belt.

The pulley 10 comprises a first side plate 11 rotating integrally with the pulley shaft 50, a second side plate 12 rotatable relatively with respect to the first side plate 11 around the pulley shaft 50, and many movable members 13 supported by the side plates 11 and 12 so as to be movable in the radial direction of the pulley 10. The first side plate 11 is formed into a shape of paired flanges having a distance therebetween in the axial direction, and is provided with many elongated holes 11a extending straight in the radial direction, which are formed on the side face of the first side plate 11 at equal intervals in the circumferential direction. The second side plate 12 is formed into a shape of paired flanges having a distance therebetween in the axial direction, and is provided with many elongated holes 12a extending curvedly, which are formed on the side face of the second side plate 12 at equal intervals in the circumferential direction. Also, the second side plate 12 is rotatably supported on the inside of the first side plate 11, and the elongated holes 11a in the first side plate 11 and the elongated holes 12a in the second side plate 12 overlap with each other so as to intersect each other. The movable members 13 are disposed on the inside of the second side plate 12, and each of both ends thereof are inserted in the elongated holes 11a and 12a of the side plates 11 and 12. In this case, each end of the movable member 13 is supported by an intersecting portion of the elongated holes 11a and 12a overlapping with each other as shown in FIG. 4A. When the side plates 11 and 12 turn relatively, the movable members 13 supported by an intersecting portion of the elongated holes 11a and 12a move in the radial direction of the pulley 10 as shown in FIG. 4B.

Figure 1:
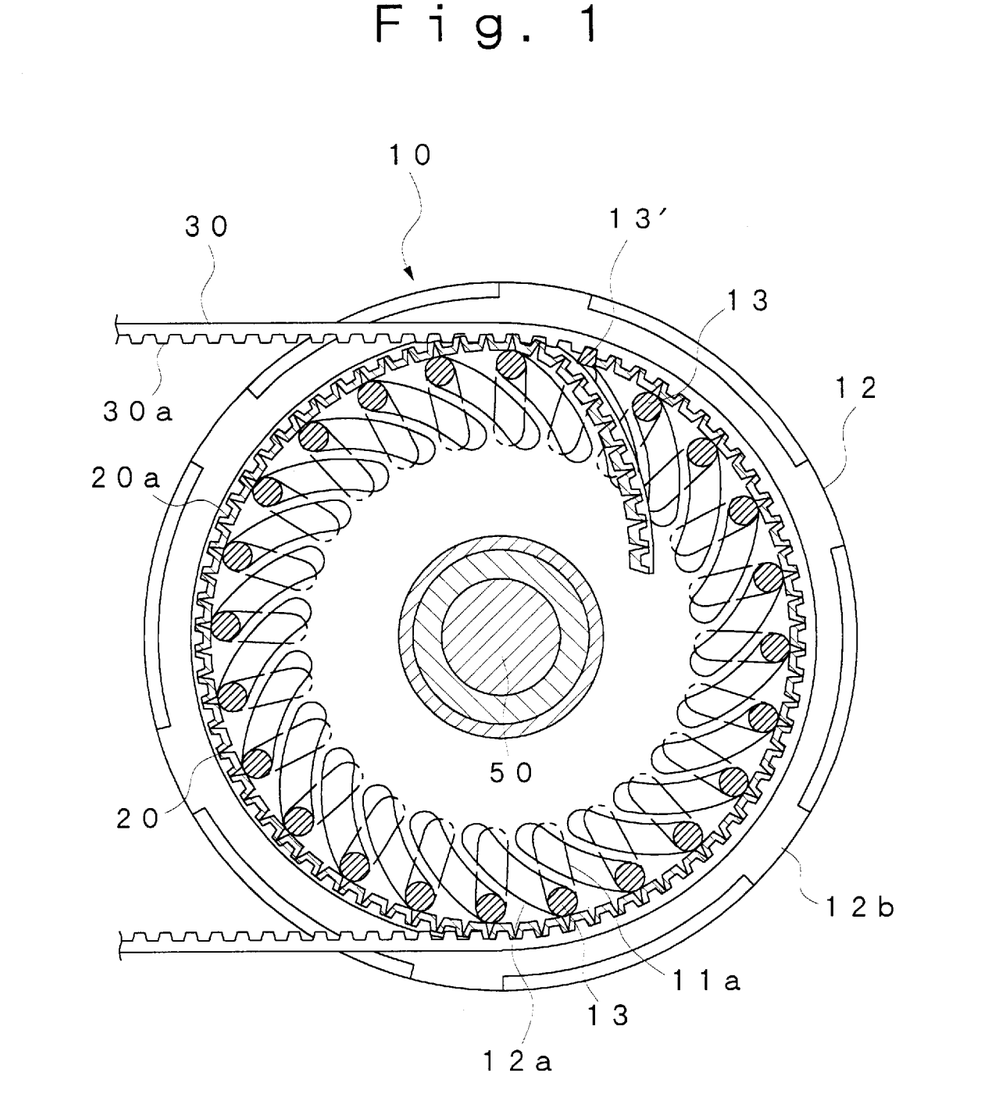
FIG. 1 is a side sectional view of a transmission in accordance with a first embodiment of the present invention.
Figure 2:
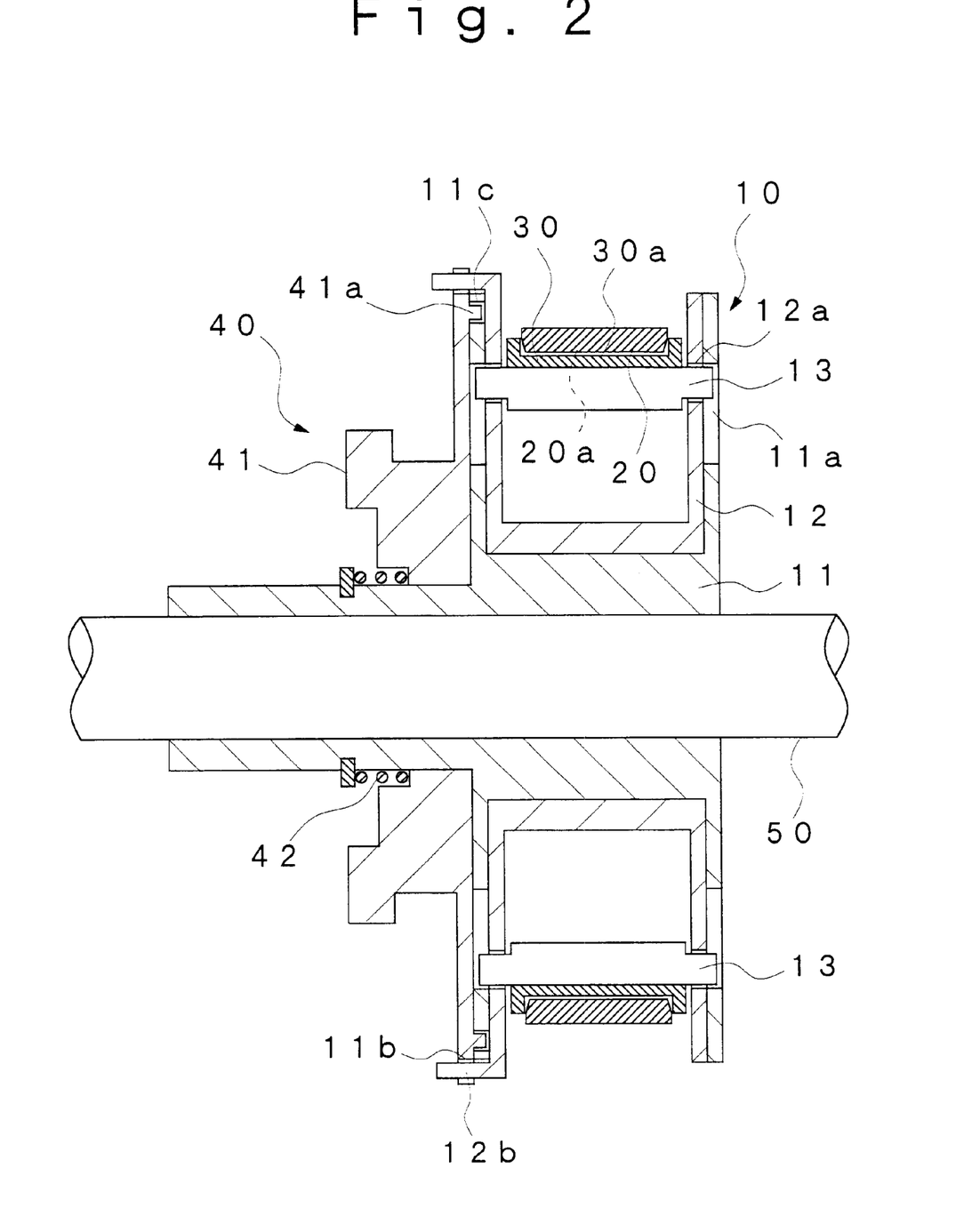
FIG. 2 is a front sectional view of the transmission.
Figure 3:
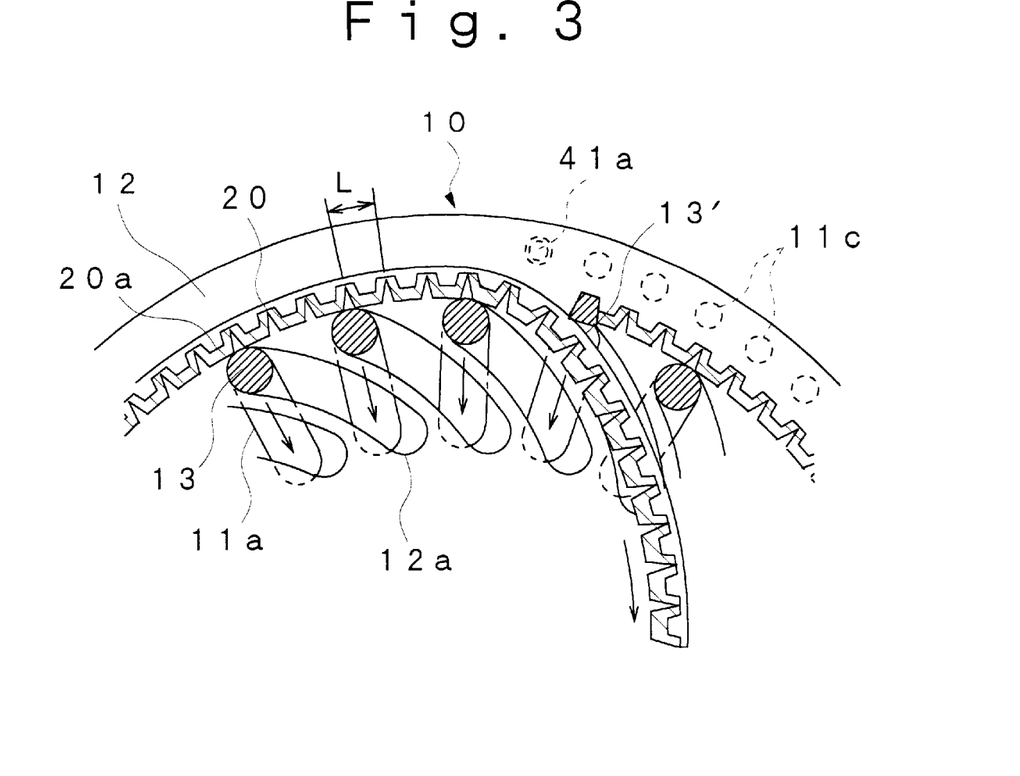
FIG. 3 is an enlarged sectional view of a principal portion of the transmission.

The winding member 20 is formed longer than the circumferential length of a belt winding portion of the pulley 10, and is provided with many grooves 20a formed at equal intervals in the lengthwise direction on the outer peripheral surface side of the winding member 20, which serve as engagement portions. That is, one end of the winding member 20 is fixed to one movable member 13', and the winding member 20 is wound on the outside of the movable members 13 and the other end thereof is inserted into the inside of the movable members 13 through between the movable member 13' and the adjacent movable member 13 in an unfixed state. In this case, as shown in FIG. 3, the movable member 13' is joined to one end portion of the winding member 20, and is formed so that the other end of the winding member 20 can pass through. Also, on the inner peripheral surface side of the winding member 20, there are formed many gaps 20b in a substantially V shape, which are located between the grooves 20a. Further, at both side portions in the width direction of the winding member 20, there are formed side walls 20c extending higher than the upper end of the grooves 20a, and the side wall 20c is bent at a bending point 20d located slightly above the gap 20b.

The belt 30 comprises a well-known toothed belt having many teeth 30a, which serve as engagement portions, formed on the inner peripheral surface of the belt 30, and passes around the pulley 10 and the other pulley (drive side or driven side), not shown. In this case, the teeth 30a of the belt 30 engages with the grooves 20a of the winding member 20.

The variable mechanism 40 is provided with a turning member 41 which turns integrally with the second side plate 12, and the turning member 41 engages with the second side plate 12 so as to be movable in the axial direction. A plurality of concave portions 41a provided on the peripheral edge of the turning member 41 are engaged with a plurality of convex portions 12b provided on the second side plate 12, and the turning member 41 is urged toward the side of the second side plate 12 by a spring 42 attached to the side of the first side plate 11. Also, on one side surface of the first side plate 11 are formed a plurality of holes 11c at intervals in the circumferential direction, and the turning member 41 is provided with a protrusion 41a inserted into an arbitrary hole 11c. That is, by moving the turning member 41 in the axial direction of the pulley shaft 50 to draw the protrusion 41a from the hole 11c, the connection between the side plates 11 and 12 is released. In this state, the side plates 11 and 12 are turned relatively, and an arbitrary hole 11c is aligned with the position of the protrusion 41a and the protrusion 41a is inserted into that hole 11c, by which the circumferential length of the winding member 20 that is wound around the movable members 13 is changed. In this case, the intervals between the holes 11c in the circumferential direction are set so that the circumferential length of the winding member 20 changes stepwise by the predetermined number of the grooves 20a. Reference character L in FIG. 3 denotes one interval of the grooves 20a.

Figure 7:
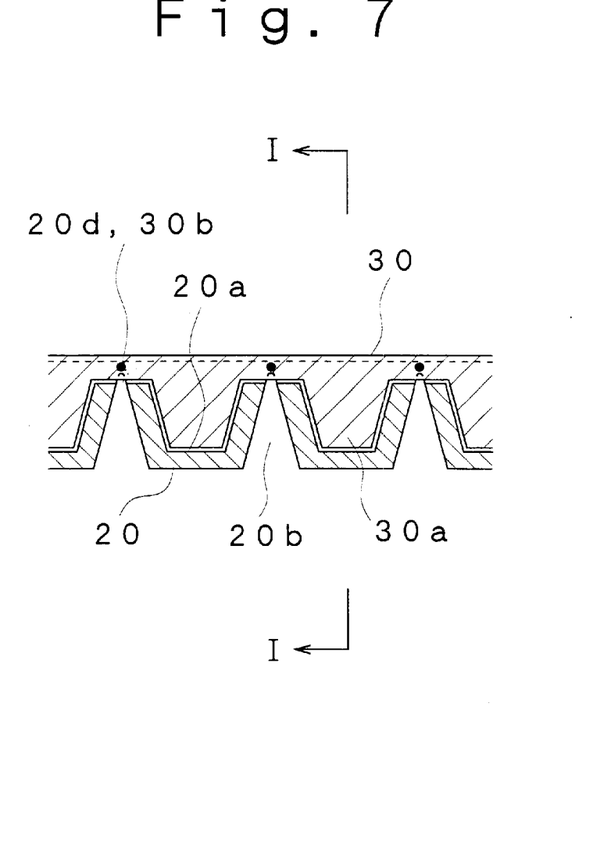
FIG. 7 is a partially sectional view of the winding member and the belt.
Figure 8:
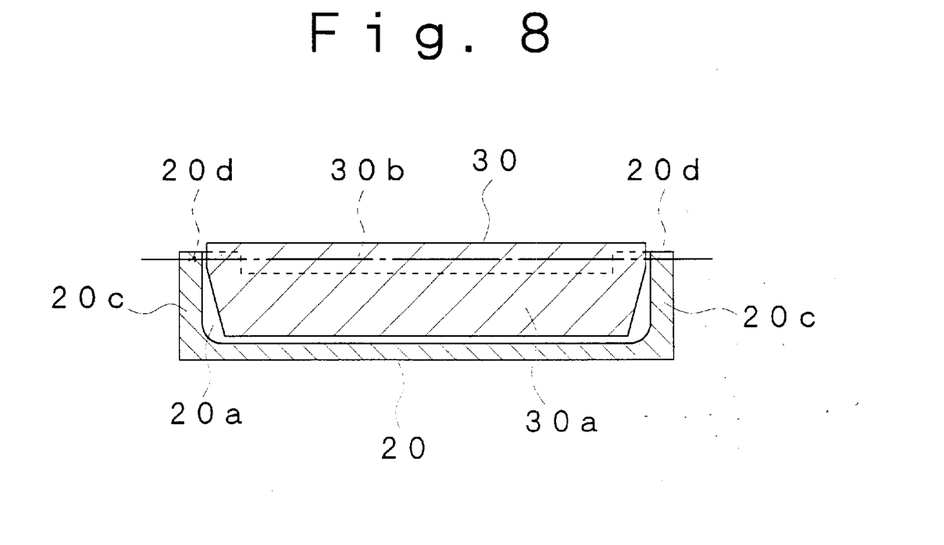
FIG. 8 is a sectional view taken along a line I—I of FIG. 7.
Figure 9:
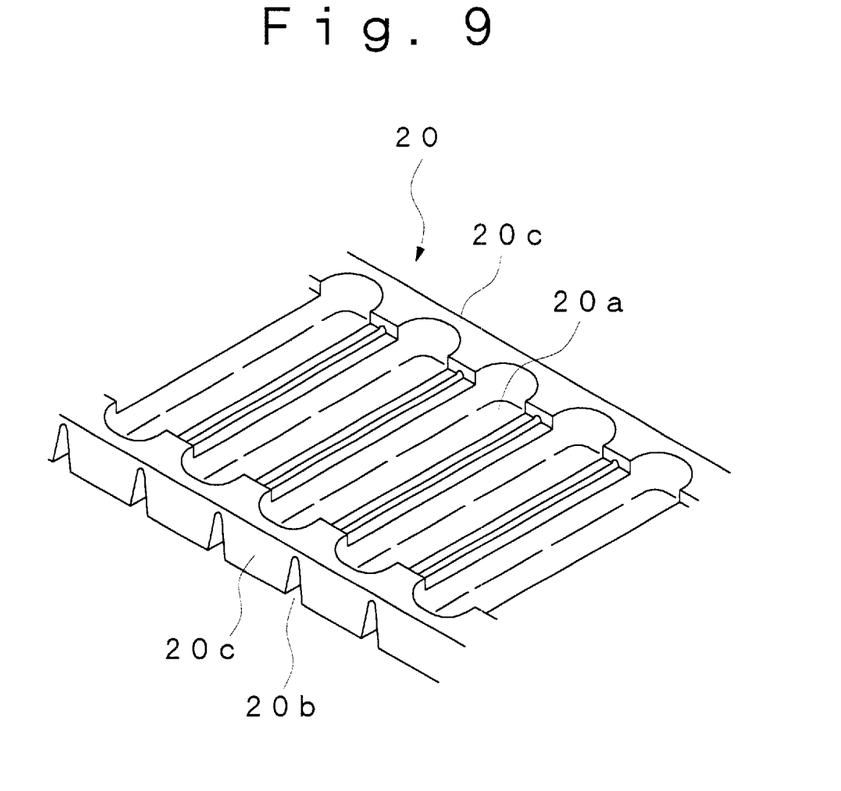
FIG. 9 is a partial perspective view of the winding member.
Figure 10:
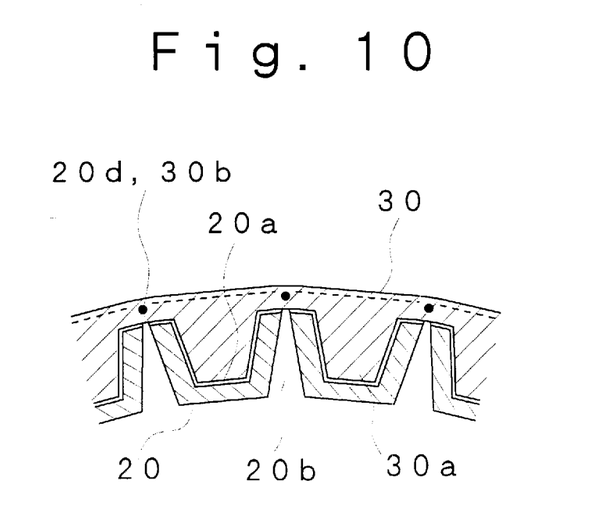
FIG. 10 is a partially sectional view of the winding member and the belt, showing a bent state.

In the transmission configured as described above, when the movable members 13 of the pulley 10 are moved in the radial direction by the variable mechanism 40, the diameter of the winding member 20 that is wound around the movable members 13 increases or decreases, so that the speed reducing ratio with respect to the other pulley, not shown, changes. That is, by causing the other end side of the winding member 20 to go in or out through between the movable members 13 and 13', the circumferential length of the winding member 20 that is wound around the movable members 13 is changed. At this time, since the circumferential length of the winding member 20 changes stepwise by the predetermined number of the grooves 20a of the winding member 20, the teeth 30a of the belt 30 are always engaged surely with the grooves 20a of the winding member 20 even if the speed is changed. Also, as shown in FIGS. 7 and 8, when the belt 30 engages with the winding member 20, the side walls 20c of the winding member 20 are located on both sides of the belt 30, and the bending points 20d of the winding member 20 and bending points 30b of the belt 30 are located at almost the same position. Thereupon, when the winding member 20 and the belt 30 are bent as shown in FIG. 10, the positions of the bending points 20d and 30b of the winding member 20 and the belt 20 do not change relatively, so that the belt 30 can always be engaged surely with the winding member 20 even if the diameter of the pulley 10 changes. At this time, the bend of the winding member 20 is absorbed by the gaps 20b.

As described above, according to the transmission of this embodiment, in the construction in which the speed is changed by changing the diameter of the pulley 10, the belt winding portion of the pulley 10 is formed by the winding member 20 having many grooves 20a, and a rotational force is transmitted by the belt 30 having many teeth 30a engaging with the grooves 20a. Therefore, power can be transmitted efficiently by the engagement of the teeth 30a with the grooves 20a. In this case, one end of the winding member 20 is fixed to the belt winding portion and the other end thereof is inserted into the inside of the belt winding portion in an unfixed state, by which the circumferential length of the winding member 20 is changed, and the circumferential length of the winding member 20 is changed stepwise by the predetermined number of the grooves 20a. Therefore, the teeth 30a of the belt 30 can always be engaged surely with the grooves 20a of the winding member 20 even if the speed is changed, and the speed change operation can be achieved surely. Also, since the elongated holes 11a of the first side plate 11 rotating integrally with the pulley shaft 50 is formed straight in the radial direction, a relative rotational difference between the movable members 13 and the pulley 10 does not occur when the movable members 13 are moved in the radial direction. Therefore, the tension of the belt 30 does not change at the time of speed change, and a stable speed change operation can always be performed.

Although only one pulley 10 has been shown in the above embodiment, the other pulley, not shown, is also configured in the same way as described above, and the diameters of the pulleys are changed in the opposite direction, by which the speed change ratio can be made great.

Figure 11:
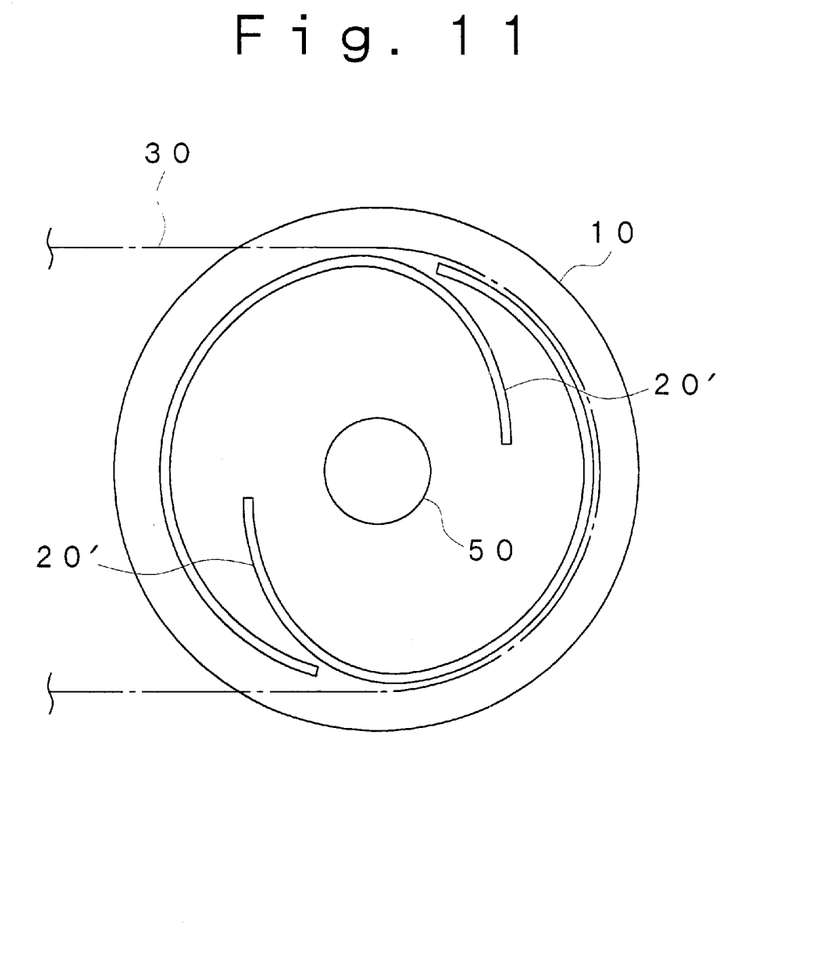
FIG. 11 is a schematic side view showing an example in which a plurality of winding members are provided in the circumferential direction of a pulley.
Figure 12:
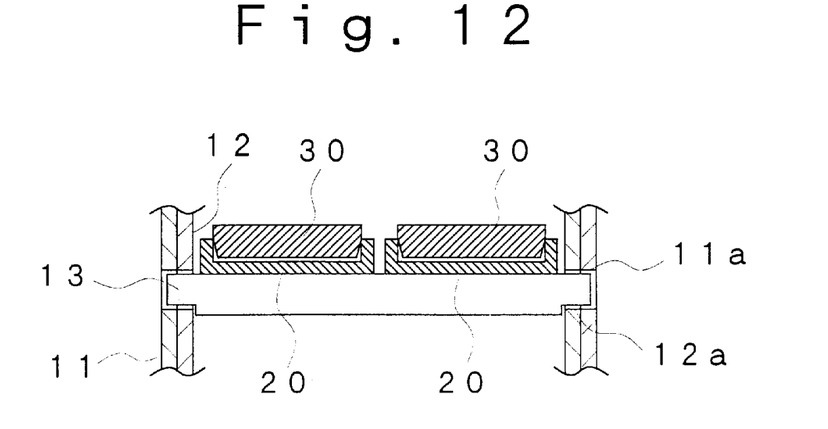
FIG. 12 is a sectional view of a principal portion showing an example in which a plurality of winding members are provided in the width direction of a pulley.

Also, although the belt winding portion of the pulley 10 has been formed by one winding member 20 in the above embodiment, a plurality of winding members 20' having a short and equal circumferential length may be arranged in the circumferential direction of the pulley 10 as shown in FIG. 11. Alternatively, a plurality of winding members 20 and belts 30 may be arranged in the width direction of the pulley 10 as shown in FIG. 12. In this case, the winding members 20' shown in FIG. 11 or the winding members 20 shown in FIG. 12 are arranged symmetrically with each other centering around the pulley shaft 50, by which the center of gravity of the pulley 10 including the winding members 20 (or 20') can be maintained on the rotating shaft thereof, so that vibrations caused by a positional shift between the center of rotation and the center of gravity can surely be prevented from occurring.

Further, although the winding member 20 has been bent at bending points 20d by partial elastic deformation of the side walls 20c in the above embodiment, the winding member 20 may be formed by many divided members that are divided at the gap 20b, and the divided members may be connected rotatably to each other at the bending point 20d.

Figure 13A:
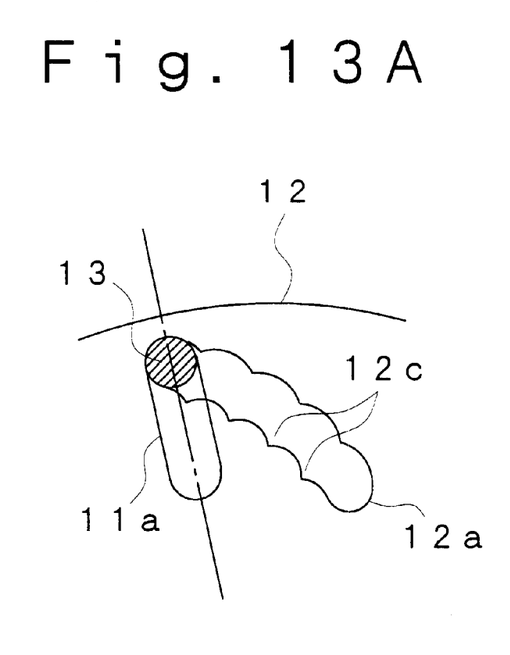
FIGS. 13A and 13B are enlarged views of a principal portion showing a modification of the elongated hole.
Figure 13B:
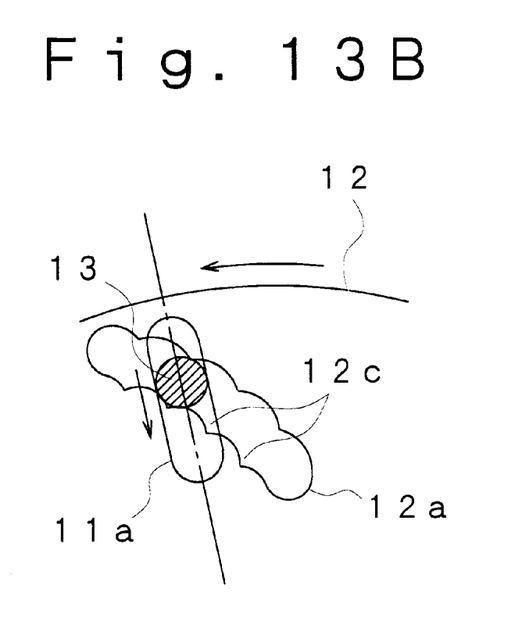

Also, the circumferential length of the winding member 20 has been changed stepwise by forming the plurality of holes 11c in the first side plate 11 and by engaging the protrusion 41a of the turning member 41 with an arbitrary hole 11c in the above embodiment, the elongated hole 12a of the second side plate 12 is formed with a plurality of grooves 12c as shown in FIG. 13A, and the movable member 13 is engaged with an arbitrary groove 12c as shown in FIG. 13B, by which the movable member 13 may be positioned stepwise.

Figure 14:
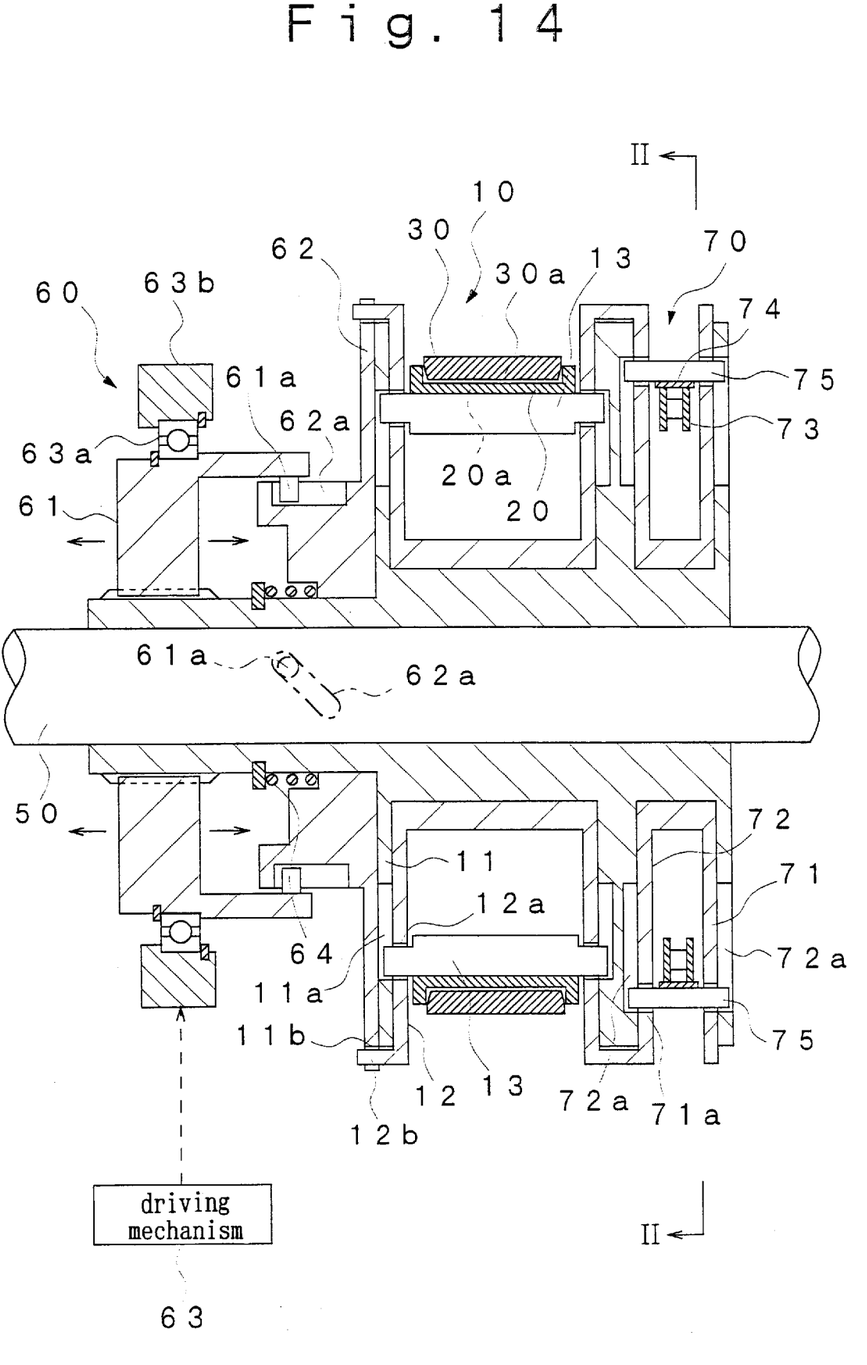
FIG. 14 is a side sectional view of the transmission in accordance with a second embodiment of the present invention.
Figure 15:
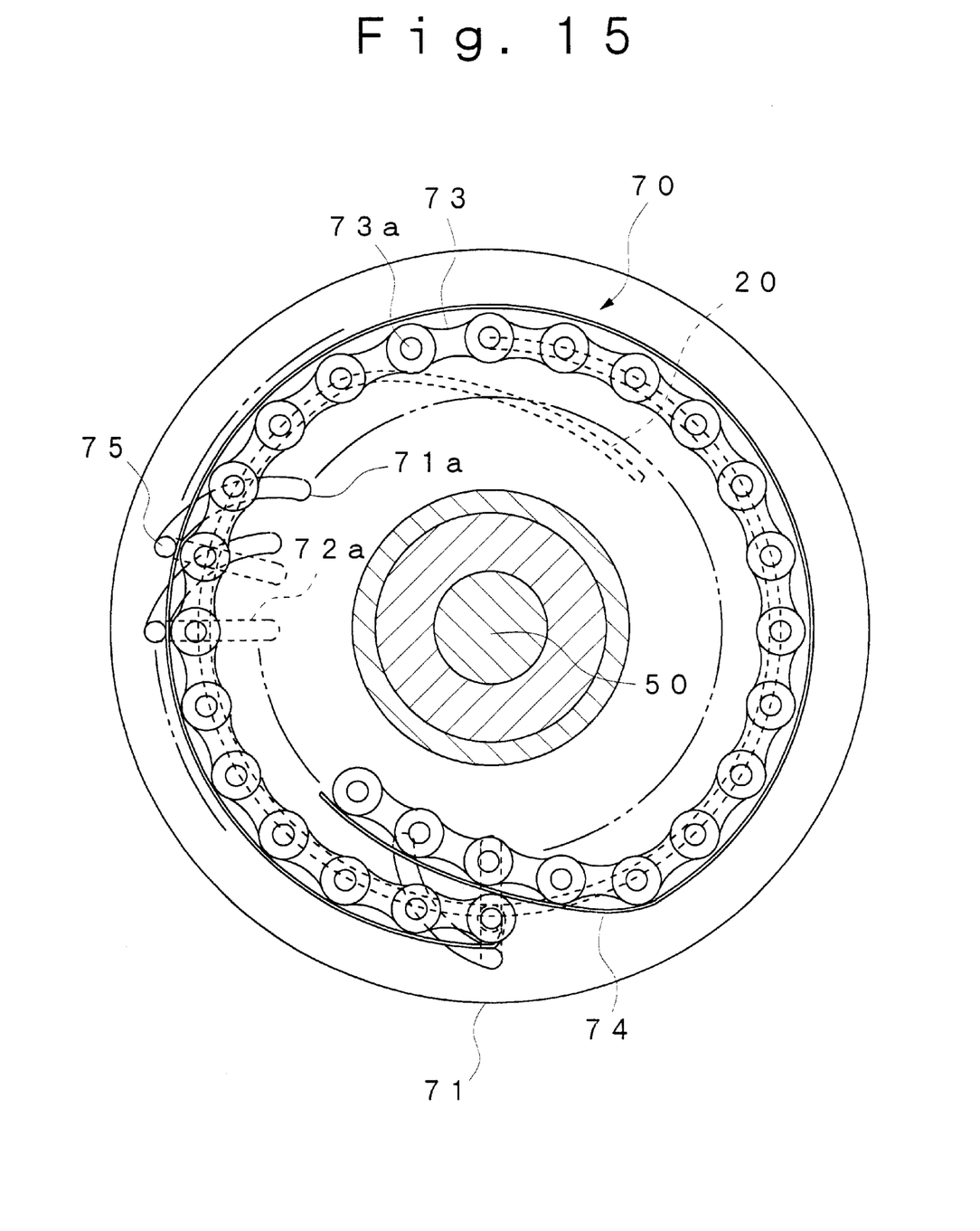
FIG. 15 is a sectional view taken along a line II—II of FIG. 14.

FIGS. 14 and 15 show a second embodiment of the present invention. Although the speed has been changed manually by means of the variable mechanism 40 in the above embodiment, the speed is changed automatically in this embodiment.

That is, a variable mechanism 60 shown in FIG. 14 comprises a first turning member 61 turning integrally with the first side plate 11, a second turning member 62 turning integrally with the second side plate 12, and a driving mechanism 63 for driving the first turning member 61. The first turning member 61 is engaged with the first side plate 11 so as to be movable in the axial direction, and at one end thereof are provided a plurality of protrusions 61a engaging with the second turning member 62 at intervals in the circumferential direction. The second turning member 62 is engaged with the second side plate 12 so as to be movable in the axial direction, and at one end thereof are provided a plurality of grooves 62a engaging with the protrusions 61a of the first turning member 61 at intervals in the circumferential direction. That is, the groove 62a of the second turning member 62 is formed slantwise with respect to the axial direction of the pulley shaft 50 as indicated by the chain line in FIG. 14. Accordingly, when the first turning member 61 moves in the axial direction, the second turning member 62 rotates around the pulley shaft 50. In this case, the second turning member 62 is engaged with convex portions 12b of the second side plate 12, and the second turning member 62 is urged toward the side of the second side plate 12 by a spring 64 attached to the side of the first side plate 11. The driving mechanism 63 has a driving member 63b rotatably attached to the first turning member 61 via a bearing 63a, and is configured so as to move the first turning member 61 in the axial direction of the pulley shaft 50 via the driving member 63b. Although simplified in FIG. 14, the driving mechanism 63 comprises a well-known mechanism capable of controlling the movement amount of the driven side, such as a hydraulic cylinder or an actuator or the like. Therefore, by moving the first turning member 61 stepwise by a predetermined amount, the circumferential length of the winding member 20 that is wound around the movable members 13 is changed by the predetermined number of the grooves 20a.

Also, the variable mechanism 60 is provided with an auxiliary mechanism 70 on one end side in the axial direction of the side plates 11 and 12. This auxiliary mechanism 70 comprises a third side plate 71 rotating integrally with the first side plate 11, a fourth side plate 72 rotating integrally with the second side plate 12, an auxiliary member 73 with ends which is attached to the side plates 71 and 72 so as to be movable in the radial direction of the pulley 10, and a guide member 74 with ends which extends along the auxiliary member 73. The third side plate 71 is formed into a shape of paired flanges having a distance therebetween in the axial direction, and is provided with many elongated holes 71a (partially shown in FIG. 15) extending curvedly, which are formed on the side face of the third side plate 71 at equal intervals in the circumferential direction. The fourth side plate 72 is formed into a shape of paired flanges having a distance therebetween in the axial direction, and is provided with many elongated holes 72a (partially shown in FIG. 15) extending straight, which are formed on the side face of the fourth side plate 72 at equal intervals in the circumferential direction. In this case, the elongated holes 71a of the third side plate 71 and the elongated holes 72a of the fourth side plate 72 overlap with each other so as to intersect each other. The auxiliary member 73 is formed into a chain shape having many rotating shafts 73a, and only the rotating shaft 73a on one end side is inserted into the predetermined elongated holes 71a and 72a. The guide member 74 is arranged on the outer periphery side of the auxiliary member 73, and one end thereof is connected to the rotating shaft 73a on one end side. Also, many pins 75 inserted into the elongated holes 71a and 72a are arranged on the outer surface side of the guide member 74. That is, the rotating shaft 73a on one end side of the auxiliary member 73 and the pins 75 are supported by an intersecting portion of the elongated holes 71a and 72a overlapping with each other, and move in the radial direction of the pulley 10, like the movable members 13 between the first and second side plates 11 and 12, when the side plates 71 and 72 turn relatively. Also, the other end sides of the auxiliary member 73 and the guide member 74 are inserted into the inside of the auxiliary member 73 in an unfixed state, like the winding member 20. In this case, the auxiliary member 73 has it a mass and a length equivalent to those of the winding member 20, and one end side (fixed end) and the other end side (free end) thereof are arranged so as to be symmetrical with the winding member 20 with respect to the pulley shaft 50.

In the above-described configuration, the second side plate 12 is turned stepwise with respect to the first side plate 11 by the driving mechanism 63 of the variable mechanism 60, by which the movable members 13 of the pulley 10 are moved in the radial direction, so that the diameter of the winding member 20 is changed. Also, in the pulley 10, the center of gravity is displaced with respect to the center of rotation of the pulley shaft 50 by the free end of the winding member 20 existing partially in the circumferential direction. However, since the auxiliary member 73 of the auxiliary mechanism 70, which rotates integrally with the pulley 10, is arranged symmetrically with the winding member 20, the displacement of the center of gravity of the pulley 10 is corrected to the side of the rotation axis of the pulley shaft 50. Thereby, the center of gravity of the pulley 10 is always maintained on the rotation axis of the pulley shaft 50, so that vibrations caused by a positional shift between the center of rotation and the center of gravity can surely be prevented from occurring. Also, when the circumferential length of the winding member 20 is changed by speed change, the circumferential length of the auxiliary member 73 of the auxiliary mechanism 70 is changed in synchronism with the winding member 20 by the radial movement of the pins 75. Therefore, a balance between the winding member 20 and the auxiliary member 73 can always be kept at any speed change position.

Although a transmission having one winding member 20 has been shown in the above embodiment, for example, as shown in FIG. 11, when a plurality of winding members 20' are provided in the circumferential direction of the pulley 10, or as shown in FIG. 12, when a plurality of winding members 20 provided in the width direction of the pulley 10, the center of gravity of the pulley 10 including the winding members 20 (or 20') can be maintained on the rotating shaft thereof as described above, so that the auxiliary mechanism 70 in the second embodiment can be omitted.

Figure 16:
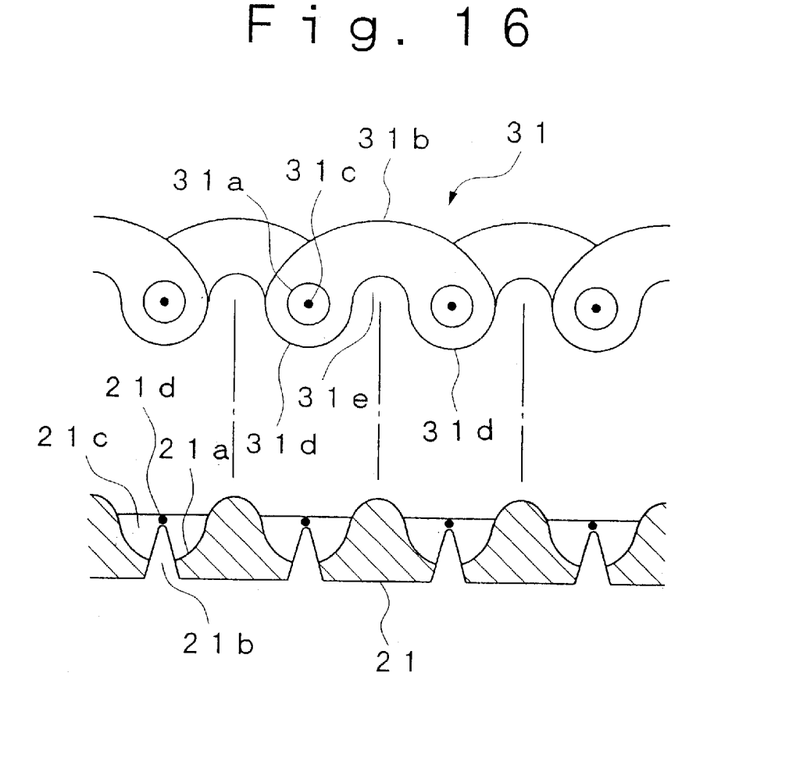
FIG. 16 is a partially sectional view of a chain and the winding member, showing a third embodiment of the present invention.
Figure 17:
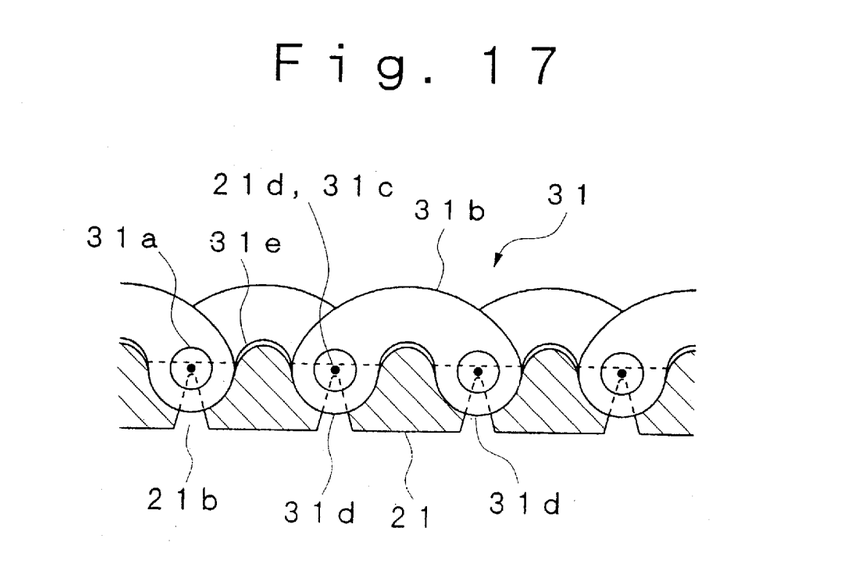
FIG. 17 is a partially sectional view of the chain and the winding member, showing an engagement state.
Figure 18:
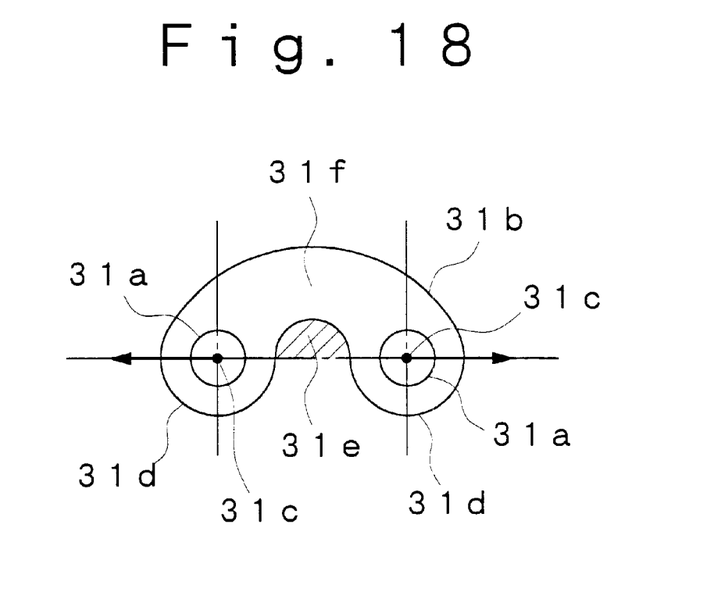
FIG. 18 is a side view of a link member.

FIGS. 16 to 18 show a third embodiment of the present invention, showing another mode of the transmitting member and the winding member.

That is, a chain 31 serving as a transmitting member shown in the figures comprises many link members 31b rotatably connected to each other via connecting pins 31a. On both end sides of the link member 31b are formed a substantially semicircular engagement portions 31d with a turning support points 31c (bending points) of the connecting pins 31a being the center. Also, a concave portion 31e continuous with the engagement portions 31d is provided between the engagement portions 31d, and the link member 31b is formed so that the upper end side in the figure is curved upward along the concave portion 31e.

Also, a winding member 21 shown in the figures has many grooves 21a engaging with the engagement portions 31d of the chain 31 on the outer peripheral surface side, and is provided with many substantially V-shaped gaps 21b each located in the center of the groove 21a on the inner peripheral surface side. That is, a part of the grooves 21a is divided in the circumferential length direction of the winding member 21 by the gaps 21b. Also, sidewalls 21c are formed at both side portions in the width direction of the winding member 21, and a portion between the grooves 21a is formed higher than the top end of the side walls 21c. In this case, the side walls 21c are bent at a bending points 21d located slightly above the gaps 21b. That is, when the chain 31 engages with the winding member 21, as shown in FIG. 17, the portions between the grooves 21a of the winding member 21 is accommodated by the concave portion 31e of the link members 31b, and the bending points 21d of the winding member 21 and the turning support points 31c, serving as a bending point, of the chain 31 come to the same positions. Therefore, like the first embodiment, when the winding member 21 and the chain 31 are bent, the positions of bending points of the winding member 21 and the chain 31 do not change relatively, so that the winding member 21 and the chain 31 can always be engaged surely with each other even if the diameter of the pulley 10 changes.

Also, in the link member 31b of the chain 31, as shown in FIG. 18, a part of the concave portion 31e is formed so as to extend to a portion (hatched portion in the figure) beyond a straight line connecting the turning support points 31c of the link member 31b. Thereupon, when a tensile force is applied to the chain 31, the link member 31b is subjected to elastic bending deformation in the direction of the solid-line arrow mark in the figure with a curved portion 31f not including the straight line connecting the turning support points 31c being the center. Therefore, if a sudden driving force is applied to the chain 31, the shock can be absorbed by the aforementioned bending deformation of the link member 31b.

Figure 19:
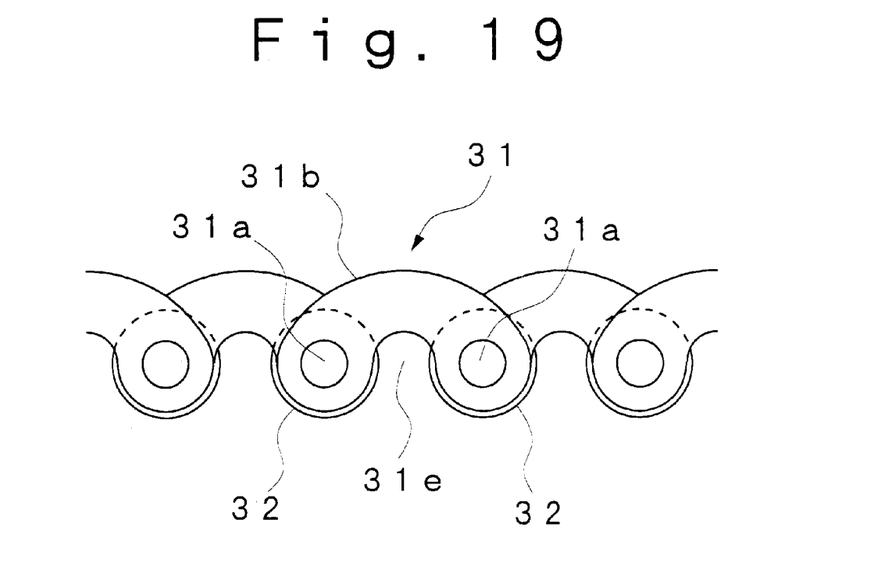
FIG. 19 is a partially sectional view of the chain, showing a fourth embodiment of the present invention.

FIG. 19 shows a fourth embodiment of the present invention, showing another mode of the transmitting member. In this embodiment, the chain 31 of the third embodiment is provided with many rollers 32 serving as engagement portions. That is, the rollers 32 are rotatably fitted to the connecting pins 31a of the chain 31, and the outer peripheral face thereof is formed slightly larger than the peripheral edge of the link member 31b so as to be in contact with the winding member side.

Figure 20:
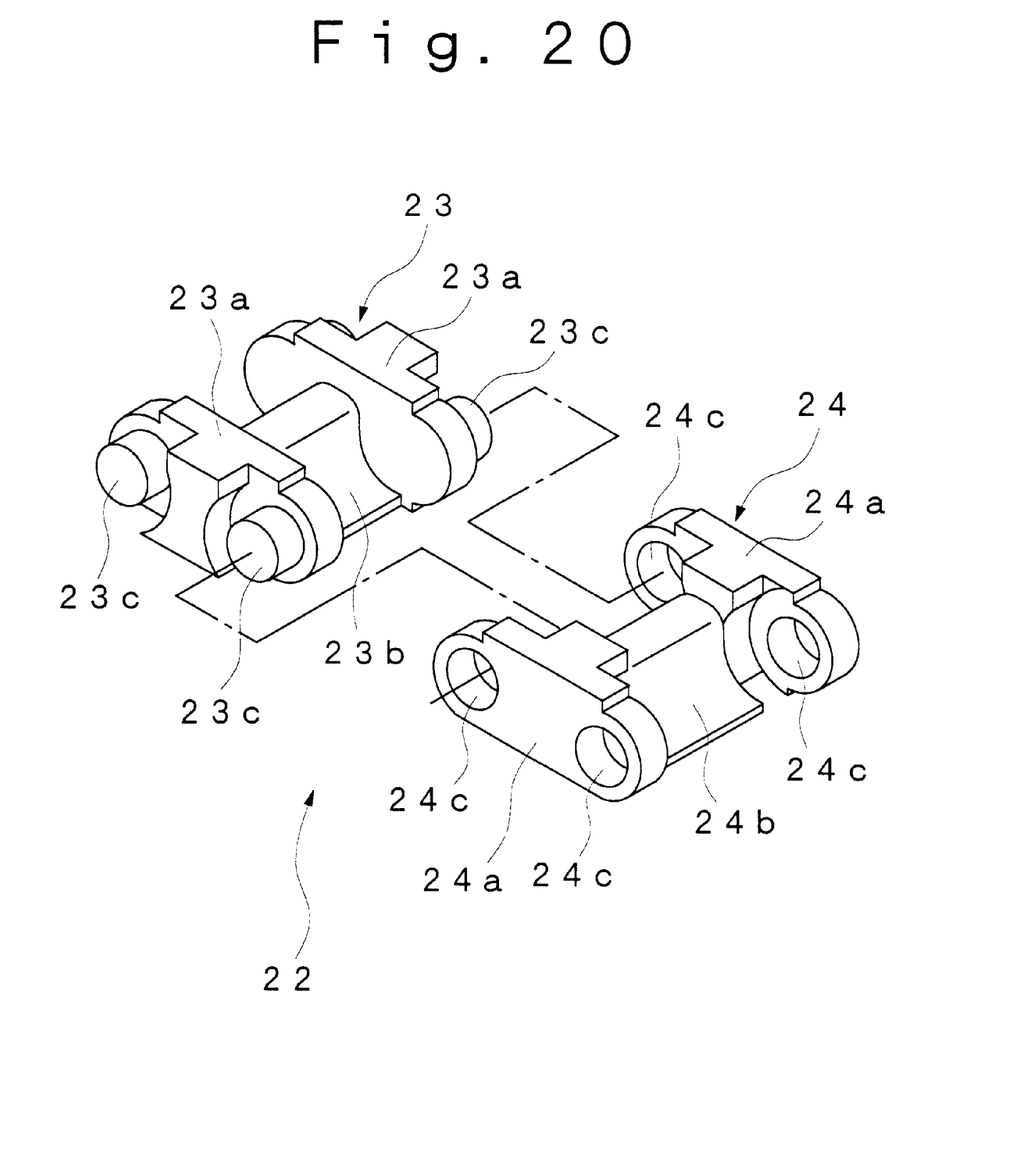
FIG. 20 is a partially exploded perspective view of the winding member, showing a fifth embodiment of the present invention.

FIG. 20 shows a fifth embodiment of the present invention, showing another mode of the winding member. That is, a winding member 22 shown in this figure comprises two kinds of divided members 23 and 24, and although not shown, the divided members 23 and 24 are connected in large numbers alternately. One divided member 23 has a pair of side walls 23a provided at both side portions in the width direction, and between the side walls 23a, divided grooves 23b, which are divided into two in the direction in which the divided members 23 and 24 are connected, are provided on one end side and the other end side in that direction. Also, on the side surface of the side walls 23a, there are provided a pair of connecting shafts 23c projecting in the width direction. The other divided member 24 has a pair of side walls 24a provided at both side portions in the width direction, and between the side wall portions 24a, divided grooves 24b, which are divided into two in the direction in which the divided members 23 and 24 are connected, are provided on one end side and the other end side in that direction. Also, the side walls 24a are formed with a pair of holes 24c penetrating in the width direction. Thus, the divided members 23 and 24 are rotatably connected to each other by the fitting of the connecting shaft 23c into the hole 24c. In this case, an engagement portion with the transmitting member is formed by the divided grooves 23b and 24b of the divided members 23 and 24.

Further, although one divided member 23 has been provided with the integrally projecting connecting shafts 23c, which is inserted into the holes 24c of the divided member 24, in the above-described embodiment, one divided member 23 may be provided with holes equal to the holes in the other divided member 24 so that a connecting shafts, which is a separate component, is inserted into these holes.

What is claimed is:

1. A transmission comprising an endless transmitting member having many engagement portions arranged at equal intervals in the peripheral direction on the inner peripheral surface thereof and a pair of rotating bodies around which the transmitting member passes, in which a transmitting member winding portion of at least one rotating body is formed by many movable members which are arranged at intervals in the circumferential direction of the rotating body and capable of moving in the radial direction of the rotating body, and the diameter of the winding portion of the rotating body is increased or decreased by moving the movable members in the radial direction, wherein there is provided a winding member with ends which are wound around the winding portion of the rotating body from the outside, one end of which is fixed to a predetermined movable member, the other end side of which is inserted into the inside of the winding portion in an unfixed state between predetermined movable members, and which has many engagement portions engaging with engagement portions of the transmitting member on the outer peripheral surface, the movable members are provided so as to move stepwise in the radial direction of the rotating body so that the circumferential length of the winding member at the winding portion changes in increments of the predetermined number of the engagement portions, and when the winding member and the transmitting member are engaged with each other with the winding member engagement portions engaged with the transmitting member, adjacent bending points in the longitudinal length of the transmitting member lie along a single circumferential arc.

2. The transmission according to claim 1, wherein the rotating body comprises a first side plate rotating integrally with the rotating shaft of the rotating body, and a second side plate capable of turning relative to the first side plate around the rotating shaft of the rotating body, the first side plate is formed with many elongated holes engaging movably with the movable member, and the second side plate is formed with many elongated holes engaging movably with the movable member and intersecting the elongated holes of the first side plate.

3. The transmission according to claim 2, wherein the elongated holes of the first side plate is formed straight in the radial direction, and the elongated holes of the second side plate is formed slantwise with respect to the elongated holes of the first side plate.

4. The transmission according to claim 2, wherein there is provided holding means capable of holding the first and second side plates at a plurality of turning positions shifting stepwise in the circumferential direction.

5. The transmission according to claim 4, wherein the holding means is formed by a plurality of holes formed at intervals in the circumferential direction of the rotating body on one side plate side, and at least one protrusion provided on the other side plate side so as to be capable of being inserted into an arbitrary hole of one side plate.

6. The transmission according to claim 4, wherein the holding means is formed by a plurality of grooves provided at intervals in the circumferential direction of the rotating body in the elongated holes of the second side plate and capable of engaging with the movable members.

7. The transmission according to claim 2, further comprising:

a first turning member which is supported on the first side plate so as to be movable in the axial direction, and rotates integrally with the first side plate;

a second turning member which is provided rotatably with the rotation axis of the first side plate being the center, and rotates integrally with the second side plate;

interlocking means for rotating the second turning member in a predetermined direction with the rotation axis of the first side plate being the center when the first turning member is moved in the axial direction of the first side plate; and driving means for moving the first turning member stepwise in the axial direction.

8. The transmission according to claim 7, wherein the interlocking means is formed by at least one groove provided in one turning member so as to be slantwise with respect to the moving direction of the first turning member, and at least one protrusion which is provided on the other turning member and engages with the groove in one turning member.

9. The transmission according to claim 1, wherein a plurality of winding members are provided in the circumferential direction of the rotating body, and the winding members are arranged so as to be symmetrical with each other with respect to the rotating shaft of the rotating body.

10. The transmission according to claim 1, wherein a plurality of winding members are provided in the width direction of the rotating body, and the winding members are arranged so as to be symmetrical with each other with respect to the rotating shaft of the rotating body.

11. The transmission according to claim 1, wherein on one end side in the axial direction of the rotating body, there is provided an auxiliary member with ends which has a mass and a length equivalent to those of the winding member and moves in the radial direction of the rotating body in synchronism with the winding member, and the auxiliary member is arranged so as to be symmetrical with the winding member with respect to the rotating shaft of the rotating body.

12. The transmission according to claim 1, wherein the engagement portions of the transmitting member are formed so as to project on the winding member side, many grooves serving as engagement portions are formed on the outer peripheral surface side of the winding member, many gaps located between the grooves are provided on the inner peripheral surface side of the winding member, and side walls having the bending points are provided at both side portions in the width direction of the winding member.

13. The transmission according to claim 12, wherein the winding member is formed by many divided members, and the divided member are connected to each other rotatably with the bending points being at turning support points.

14. The transmission according to claim 12, wherein the transmitting member is formed by many link members both ends of which are connected to each other rotatably, the engagement portions are formed with the turning support points of the link member being the center, and a concave portion for accommodating a portion between the grooves of the winding member is provided between the turning support points of the link member.

15. The transmission according to claim 14, wherein the link member is formed so that a part of the concave portion extends to a portion beyond a straight line connecting the turning support points of the link member.

16. The transmission according to claim 1, wherein corresponding ones of the bending points of the winding member and the transmitting member are aligned in a circumferential direction.

17. The transmission according to claim 1, wherein each of the bending points of the winding member is located in a gap formed between grooves of the winding member and each of the bending points in the transmitting member is located intermediate each of the teeth of the transmitting member.

18. The transmission according to claim 1, wherein the bending points are located between teeth on the transmitting member.

19. The transmission of claim 18, wherein the transmitting member is a toothed belt.

20. The transmission of claim 14, wherein the bending points are located at points where the link members are rotatably connected to each other.

* * * * *